United States Patent Office 2,850,405
Patented Sept. 2, 1958

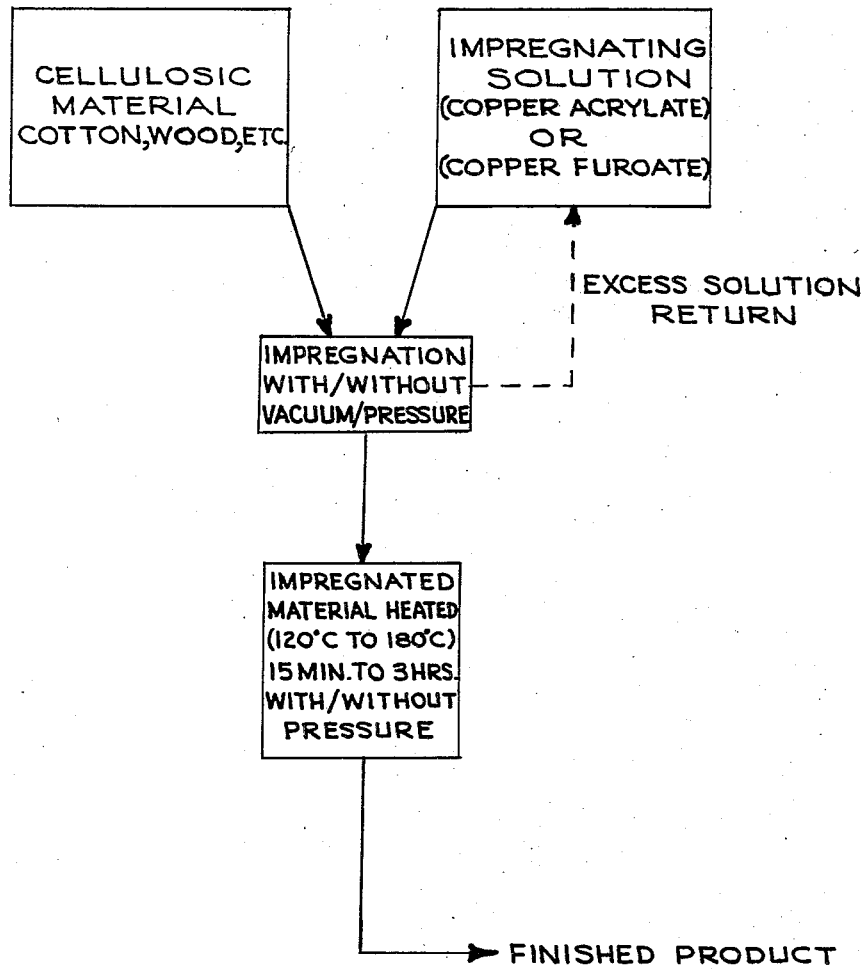
INVENTOR.
ROBERT ROGER BOTTOMS

2,850,405

METHOD OF INCREASING THE IMMUNITY OF CELLULOSE TO DECAY AND TREATED ARTICLE

Robert Roger Bottoms, Crestwood, Ky., assignor to National Cylinder Gas Company, Chicago, Ill., a corporation of Delaware Application January 17, 1957, Serial No. 634,605

6 Claims. (Cl. 117—65)

This invention relates to immunization of cellulose materials against deterioration and attack from organic agents of decay. More particularly it relates to means for increasing the immunity of cellulose against action of such organic agents of decay and to cellulose compositions having such increased immunity.

The present invention involves incorporating copper acrylate and/or copper furoate in cellulosic materials by impregnation, particularly from aqueous solution, and heating the impregnated cellulosic materials at a temperature between about 120° C. and 180° C.

Cellulosic materials as for example wood, cotton, regenerated cellulose, jute and sisal, including fabrics, yarns and threads containing such materials when treated according to this invention exhibit increased immunity to attack by not only *Chaetomium globosum* but also to attack by other cellulolytic organisms and agents of decay associated with soil.

Challenge by cultures of *Chaetomium globosum* is a far less rigorous challenge than is that presented by the mixed organisms and agents of decay present in biologically active soil. Thus the most effective and satisfactory criterion for resistance to organic agents of decay is the soil burial test in which samples of cellulosic materials are subjected to burial in soil under conditions of temperature and moisture which are conducive to growth of organic agents of decay normally occurring in biologically active soil. It has been found that treatment of cellulosic materials with copper acrylate and with copper furoate according to this invention each provide in the treated materials distinctive and different resistance to the agents of decay present in soil than is attainable by similar treatment of the same materials with other copper salts as for example copper glycolate, copper benzoate and copper aconitate. While all of such latter copper salts when impregnated into cellulosic materials and the impregnated materials heated at 120° C. to 180° C. result in a product having resistance to a pure culture of *Chaetomium globosum*, none of these thus treated materials show satisfactory resistance to the mixed organisms and agents of decay present in soil. They fail to resist soil burial for one month satisfactorily. Thus after soil burial for one month, a cotton fabric so treated with copper glycolate showed a residual strength of only 45.3% of that which it exhibited before soil burial; the same fabric treated with copper aconitate showed only a 33.7% residual strength; and the same fabric treated with copper benzoate showed only a 27.6% residual strength. Under identical conditions of soil burial the same fabric treated with copper furoate and the same fabric treated with copper acrylate according to this invention showed a substantially 100% retention of residual strength.

Another desirable attribute in increasing the immunity of cellulose against decay is the effectiveness of the treatment to resist weathering. When samples of cotton fabric are treated with copper acrylate and copper furoate according to this invention and subjected to accelerated simulated weathering involving alternate wetting and drying and exposure to ultraviolet light in a suitable apparatus, such for example as the "Atlas Twin Arc Weather-Ometer" for 200 hours, the resistance of the fabric to the challenge of *Chaetomium globosum* was no less than before such accelerated simulated weathering. By contrast, identical cotton fabric similarly treated with copper benzoate when subjected to identical acclerated simulated weathering conditions and the same *C. globosum* test exhibited only 66.7% of the strength which it had exhibited under this test prior to wetting. This test indicated that resistance even to *C. globosum* is largely lost with copper benzoate due to combined action of water and light, while with copper acrylate and copper furoate weathering exhibited no adverse effect.

In the impregnation phase of the process it is most desirable that the copper salt be applied from water solution to give the desired pick-up of salt on fabric. Use of organic solvents in the impregnation phase is undesirable because of cost and technical difficulties. For purposes of this invention it is essential that an amount of the salt taken up by the cellulosic material be equivalent at least to 0.5% copper based on the dry weight of the treated material. Pick-ups considerably in excess of this minimum amount are easily attainable with aqueous solutions of copper acrylate and aqueous solutions of copper furoate, each of which salts appear to be substantive to cellulosic materials. By contrast copper benzoate is so slightly soluble in water that a sufficient pick-up from aqueous solutions has been found impossible and a pick-up of about 0.4% copper based on dry weight of the cellulosic material is the maximum that has been attained even with solutions of copper benzoate in suitable organic solvents such as ethylene glycol monoethyl ether.

The impregnated cellulosic material may then be subjected to heating at a temperature between 120° C. and 180° C. in any desired manner. The necessary heating of the impregnated material may conveniently be accomplished by subjecting the impregnated material to steam at the desired temperature. The heating may also be accomplished in air, hydrogen, nitrogen, or other gases at atmospheric, increased, or reduced pressure. It is preferred that the heating be continued for a period of one-quarter hour to three hours.

The heating step serves to decompose the copper acrylate and copper furoate as evidenced by a color change from green to tan. There is evidence also that the process results in chemical binding to cellulose molecules of a portion of the retained copper resulting from decomposition of the impregnated salt, and that a substantial portion of the remainder of the copper in the cellulosic material is converted to cuprous oxide or other insoluble copper compounds.

The following examples will serve to illustrate some embodiments of the invention:

Example 1

Cotton duck impregnated with a water solution of copper acrylate passed through squeeze rolls of a padder to give a copper concentration on the fabric of 1.5% based on the dry weight of the fabric is air dried and then heated with steam at 121° C. (15 p. s. i.) for thirty minutes. The treated product, exhibited complete resistance to a culture of *C. globosum* and showed no decrease of strength after one month's burial in biologically active soil. Under identical conditions, untreated fabric subjected to this test was completely disintegrated in seven days. A sample of the treated cotton product was leached with 4% aqueous ammonia for two hours and after leaching showed a copper content based on dry fabric weight of 1.2%. This indicates that the retained copper is chemically bound to the cellulose in a manner resisting solution by ammonia.

*Example II*

Cotton was treated with an aqeous solution of copper furoate and passed through rollers of a padder to give a retention of copper furoate equivalent to 0.5% copper based on the dry weight of the cotton. The treated cotton was then heated at 125° C. for thirty minutes. The treated cotton exhibited complete resistance to a culture of *C. globosum* and showed after burial in soil for one month retention of 94.1% of the strength it had prior to soil burial.

This application is a continuation in part of my application Serial No. 410,718 filed February 16, 1954, now abandoned.

Having described my invention, what I claim as new and desire to secure by Letters Patent is:

1. A method for increasing the immunity of cellulosic material to the action of organic agents of decay associated with soil which comprises impregnating cellulosic material with an aqueous solution of copper acrylate to deposit thereon an amount of copper acrylate equivalent to at least 0.5% copper based on the weight of the cellulosic material treated, and heating the impregnated cellulosic material at a temperature of about 120° C. to about 180° C. for a period of about one-quarter hour to three hours.

2. A method for increasing the immunity of cellulosic material to the action of organic agents of decay associated with soil which comprises impregnating cellulosic material with an aqueous solution of copper furoate to deposit thereon an amount of copper furoate equivalent to at least 0.5% copper based on the weight of the cellulosic material treated, and heating the impregnated cellulosic material at a temperature of about 120° C. to about 180° C. for a period of about one-quarter hour to three hours.

3. A method for increasing the immunity of cotton material to the action of organic agents of decay associated with soil which comprises impregnating cotton material with an aqueous solution of copper acrylate to deposit thereon an amount of copper acrylate equivalent to at least 0.5% copper based on the weight of the cotton material treated, and heating the impregnated cotton material at a temperature of about 120° C. to about 180° C. for a period of about one-quarter hour to three hours.

4. A method for increasing the immunity of cotton material to the action of organic agents of decay associated with soil which comprises impregnating cotton material with an aqueous solution of copper furoate to deposit thereon an amount of copper furoate equivalent to at least 0.5% copper based on the weight of the cotton material treated, and heating the impregnated cotton material at a temperature of about 120° c. to about 180° C. for a period of about one-quarter hour to three hours.

5. A method for increasing the immunity of cellulosic material to the action of organic agents of decay associated with soil which comprises impregnating cellulosic material with an aqueous solution of a copper salt selected from the group consisting of copper acrylate and copper furoate to deposit thereon an amount of said copper salt equivalent to at least 0.5% copper based on the weight of the cellulosic material treated, and heating the impregnated cellulosic material at a temperature of about 120° C. to about 180° C. for a period of about one-quarter to three hours.

6. The product produced by the process of claim 5.

References Cited in the file of this patent

UNITED STATES PATENTS 1,779,258    McDermott _____ Oct. 21, 1930

OTHER REFERENCES

Marsh: "Ind. Eng. Chem.," February 1944, pages 176–181.

Bogary: "Am. Dyestuff Rep.," March 21, 1949, vol. 38, No. 6, pages 253, 259.